(12) United States Patent
Matsuda et al.

(10) Patent No.: US 8,857,899 B2
(45) Date of Patent: Oct. 14, 2014

(54) VEHICLE

(71) Applicant: Fuji Jukogyo Kabushiki Kaisha, Tokyo (JP)

(72) Inventors: Hiroshi Matsuda, Tokyo (JP); Jun Watanabe, Tokyo (JP); Tsukasa Hoshino, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/827,324

(22) Filed: Mar. 14, 2013

(65) Prior Publication Data

US 2013/0257098 A1    Oct. 3, 2013

(30) Foreign Application Priority Data

Mar. 30, 2012  (JP) ................. 2012-083017
Mar. 30, 2012  (JP) ................. 2012-083018

(51) Int. Cl.

| | | |
|---|---|---|
| *B60N 99/00* | (2006.01) | |
| *B62D 29/00* | (2006.01) | |
| *B62D 25/00* | (2006.01) | |
| *B62D 25/02* | (2006.01) | |
| *B62D 25/04* | (2006.01) | |
| *B62D 29/04* | (2006.01) | |

(52) U.S. Cl.
CPC .............. *B62D 25/00* (2013.01); *B62D 29/005* (2013.01); *B62D 25/02* (2013.01); *B62D 25/04* (2013.01); *B62D 29/043* (2013.01)

USPC ................................ 296/187.12; 296/203.03

(58) Field of Classification Search
CPC ................................ B62D 21/15; B62D 25/00
USPC ................... 296/187.12, 203.02, 203.03
See application file for complete search history.

(56) References Cited

U.S. PATENT DOCUMENTS

| | | | | |
|---|---|---|---|---|
| 3,842,944 A | * | 10/1974 | Shiotani et al. | ............... 188/376 |
| 5,819,408 A | * | 10/1998 | Catlin | ......................... 29/897.2 |
| 7,581,782 B2 | * | 9/2009 | Tomozawa | ............... 296/187.12 |
| 7,753,437 B2 | * | 7/2010 | Klimek | .................... 296/187.08 |
| 8,047,603 B2 | * | 11/2011 | Goral et al. | ............. 296/187.03 |
| 2008/0066983 A1 | * | 3/2008 | Kimoto et al. | ............... 180/69.2 |
| 2012/0153669 A1 | * | 6/2012 | Nagwanshi et al. | ..... 296/187.08 |

FOREIGN PATENT DOCUMENTS

| | | |
|---|---|---|
| JP | 2000-108930 A | 4/2000 |
| JP | 2001-71948 A | 3/2001 |
| JP | 2004-123036 A | 4/2004 |

* cited by examiner

*Primary Examiner* — Lori Lyjak
(74) *Attorney, Agent, or Firm* — Smith, Gambrell & Russell, LLP

(57) ABSTRACT

There is provided a vehicle. The vehicle of a first aspect of the present invention includes a main frame constituted by a structure in which an outer member and an inner member are connected to each other. A reinforcing member (reinforcement pillar center outers) made of reinforced plastics is interposed between the outer member and the inner member. The vehicle of a second aspect of the present invention includes a plurality of members. One (a pillar center inner) of at least two members (for example, a pillar center inner and a panel side outer) connected to each other is made of reinforced plastics.

18 Claims, 12 Drawing Sheets

VEHICLE

CROSS-REFERENCES TO RELATED APPLICATIONS

The present application claims priority from Japanese Patent Application No. 2012-083017 filed on Mar. 30, 2012 and Japanese Patent Application No. 2012-083018 filed on Mar. 30, 2012, the entire contents of which are hereby incorporated by reference.

BACKGROUND OF THE INVENTION

1. Field of the Invention

The present invention relates to a vehicle that includes a main frame constituted by a structure in which an outer member and an inner member are connected to each other and that uses reinforced plastics in a part of a panel constituting the frame of the vehicle.

2. Description of the Related Art

Conventionally, in a vehicle including a main frame constituted by a structure in which an outer member and an inner member are connected to each other, the outer and inner members that constitute the main frame of the vehicle are made of a steel sheet (a high-tensile steel sheet or a super-high-tensile steel sheet), an iron sheet, an aluminum sheet, or the like. Sufficient strength has been required for such a vehicle having a main frame constituted by a structure in which outer and inner members are connected to each other in order to ensure safety of a vehicle cabin in the case of a sudden front or side shock or an offset collision.

However, if strength is increased, the continuity of the characteristics of load transmission to a vehicle when executing a turn on a curve will be compromised. This will influence vehicle stability. Accordingly, a balance between collision safety and vehicle stability has been required.

For example, Japanese Unexamined Patent Application Publication (JP-A) No. 2000-108930 discloses a lower structure of a vehicle side that disperses and transmits a collision load from a front or side of a vehicle to other members and suppresses deformation due to a collision.

JP-A No. 2001-71948 discloses a structure that is provided on a side roof of a vehicle side with a rail reinforcing member and on a side seal with a seal strength adjusting member, respectively, and that changes the vehicle deformation mode upon the occurrence of a side collision.

On the other hand, JP-A No. 2004-123036 discloses a technique for molding at least one of an inner panel and an outer panel out of fiber reinforced plastics in a structure for fixing a wire harness to a vehicle body.

However, in the above three Japanese Unexamined Patent Application Publications, the vehicle frame has insufficient strength and stiffness in view of vehicle stability and collision safety.

SUMMARY OF THE INVENTION

Accordingly, an object of the present invention is to provide a vehicle in which a balance between strength and stiffness of a vehicle frame is ensured in view of vehicle stability and collision safety and that can increase strength against further shock.

A first aspect of the present invention provides a vehicle that includes a main frame constituted by a structure in which an outer member and an inner member are connected to each other. A reinforcing member made of reinforced plastics is interposed between the outer member and the inner member.

Preferably, the reinforcing member includes shock absorbing members made of reinforced plastics.

Preferably, the shock absorbing members extend from a reinforcing member side to an outer member side.

Preferably, the shock absorbing members are formed into plate-like shapes and have the same thickness and length.

Preferably, the shock absorbing members are formed into plate-like shapes and have the same thickness and different lengths.

Preferably, the shock absorbing members are formed into plate-like shapes and have thicknesses that decrease gradually from an inner member side to the outer member side.

Preferably, the shock absorbing members are formed into plate-like shapes and grid-like configurations.

Preferably, the reinforced plastics is either one of fiber reinforced plastics and carbon fiber reinforced plastics (hereinafter referred to "CFRP").

A second aspect of the present invention provides a vehicle that includes a plurality of members. One of at least two members connected to each other is made of reinforced plastics.

Preferably, a connecting member in which the at-least two members are connected to each other is made of reinforced plastics.

Preferably, the members include an inner member and an outer member, the inner and outer members constitute a vehicle structure, and the inner member is made of reinforced plastics.

Preferably, the outer member is provided with a reinforced plastics panel on the inside of the vehicle.

Preferably, the members and/or the connecting member made of reinforced plastics are provided with shock absorbing members.

Preferably, the shock absorbing members extend from an inner member side to an outer member side.

DESCRIPTION OF THE PREFERRED EMBODIMENTS

First, a first invention will be described below.

Figure 1:
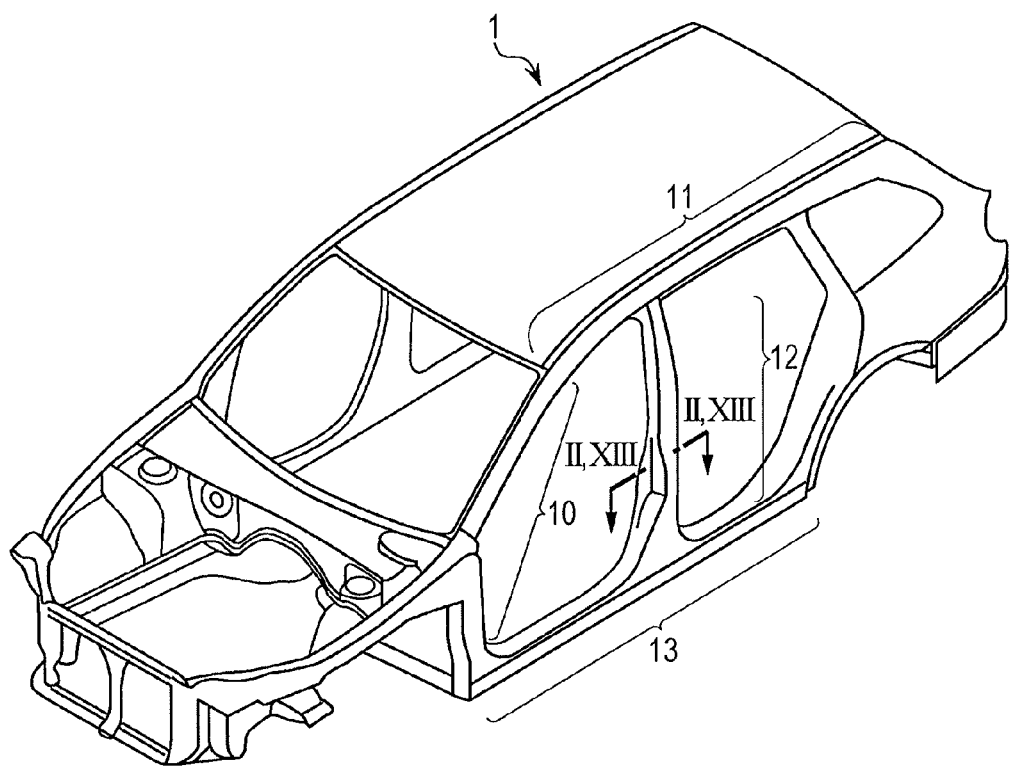
FIG. 1 is a perspective view of a vehicle according to basic embodiments of first and second aspects of the present inventions.
Figure 2:
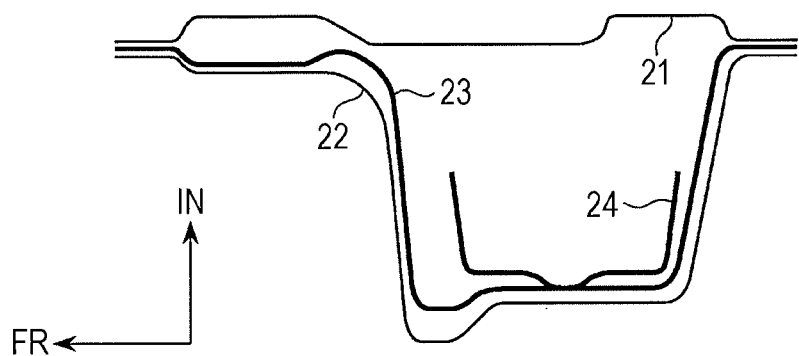
FIG. 2 is a cross-sectional view taken along lines II-II in FIG. 1, illustrating the vehicle according to a basic embodiment of the first aspect.

FIG. 1 shows basic embodiments of each of a first aspect and a second aspect. FIG. 2 shows a basic embodiment of a first aspect. The basic embodiment of the first aspect will be below by referring to FIGS. 1 and 2.

FIG. 1 is a perspective view of a vehicle 1 according to the first embodiment of the first aspect. The vehicle 1 includes a plurality of members and frames such as a front pillar member 10, a roof pillar member 11, a center pillar member 12, and a side seal member 13.

The front pillar member 10 constitutes a front section that defines a vehicle cabin space for the vehicle 1. The front pillar member 10 is disposed in such a manner as to hold a side of a front glass. The front pillar member 10 extends from an upper section to a lower section of the vehicle 1 and is coupled to the roof pillar member 11 and the side seal 13.

The roof pillar member 11 extends longitudinally along an upper section that defines the vehicle cabin space for the vehicle 1 and constitutes a side portion of the roof of the vehicle 1.

The center pillar member 12 is a post-like pillar located between a front door and a rear door of the vehicle 1 and is located so as to extend vertically on the side of the vehicle 1 between the roof pillar member 11 and the side seal 13.

The side seal 13 is located so as to extend longitudinally on a lower section of the side of the vehicle 1.

The respective members further include a plurality of members such as a combination of an inner member and an outer member, and a combination of the inner and outer members and a reinforcement (a reinforcing member) interposed between the inner member and the outer member. In this embodiment, the reinforcement is made of CFRP.

FIG. 2 is a cross-sectional view taken along lines II-II in FIG. 1, illustrating the vehicle 1 according to the basic embodiment of the first aspect. In the embodiment, a pillar center inner 21 and a panel side outer 22 are coupled to each other. A reinforcement pillar center outer 23 and a reinforcement pillar center outer 24 are provided as reinforcing members between the pillar center inner 21 and the panel side outer 22.

The reinforcement pillar center outer 23 and reinforcement pillar center outer 24 are made of CFRP.

The ends of the pillar center inner 21 and the ends of the panel side outer 22 are secured to each other through an adhesive, screws, rivets, or a resin.

In the above structure, the reinforcements (the reinforcing members) interposed between the inner member and the outer member that are made of CFRP can preferably maintain strength in a collision. Because CFRP has a characteristic of rigidity, a heavy load can be transmitted.

Thus, there is a balance between collision safety and vehicle stability. Since the reinforcement in the embodiment is made of light CFRP in comparison with conventional reinforcements that use a steel sheet, an iron sheet, or an aluminum sheet, it is possible to reduce the weight of the whole of the vehicle 1.

For example, in the case where any sudden force is applied to the front pillar member 10 from a front side of the vehicle, if strength and transmission stiffness against bending to the front pillar member 10 are not balanced, the sudden force is not transmitted to the front pillar member 10 properly and the strength of the front pillar member 10 becomes inadequate, thereby resulting in bending of the front pillar member 10. However, according to the embodiment, an appropriate force can be transmitted to the front pillar member 10 and the front pillar member 10 is not bent by designing reinforced plastics so that there is a balance between strength and stiffness.

Furthermore, a force applied to the front side of the vehicle 1 is transmitted through a bumper and front side members each located on an inner side of each of right and left front wheels and through a stiffener that connects the front pillar member 10 and a front side member, and then is dispersed in the front pillar member 10, the side seal member 13, a center tunnel, and the like. Thus, all of the external force applied to the front side of the vehicle 1 is not received by the vehicle front section and a part of the force is diverted to a rear side of the vehicle 1.

The first aspect of the present invention can be applied to a front side member, stiffener, and a center tunnel as well as the members that transmit the external force described above and that require strength against the external force, for example, the front pillar member 10, the roof pillar member 11, the center pillar member 12, and the side seal member 13 shown in FIG. 1.

In the case where there is any clearance in a connected portion between the members, it is possible to adjust required strength and stiffness by inserting CFRP for reinforcement.

Usually, the frame of a vehicle is made of steel sheets having different strength and stiffness. Multiple kinds of high-tensile steel or high-tensile steel are used in accordance with tensile strength in order to meet the requirements of a passive safety standard.

On the other hand, when multiple kinds of high-tensile steel or super-high-tensile steel would not be obtained at the same time due to circumstances in a factory, it is possible to utilize the first aspect of the present invention. That is, it is possible to design the respective sections of the frame of the vehicle so as to satisfy strength and stiffness required for the sections by using the reinforcement of the embodiment instead of plural kinds of high-tensile steel or super-high-tensile steel.

The strength and stiffness can be adjusted by altering the thickness of the reinforcement made of CFRP in the embodiment, the orientation of fibers when producing or working the plastics, and the material to be synthesized.

It is possible for the first aspect of the present invention to achieve the required strength and stiffness by using the reinforcement made of CFRP, even if only a few kinds of steel sheet are available, that is, even if plural kinds of steel sheet that have the required strength and stiffness are not available.

Although carbon fiber reinforced plastics (CFRP) is used in the basic embodiment of the first aspect of the present invention, fiber reinforced plastics (FRP), carbon fiber reinforced thermosets (CFRTS), or carbon fiber reinforced thermoplastics (CFRTP) may be used. These materials can be used in accordance with characteristics or other conditions required for the respective sections of the vehicle.

Figure 3:
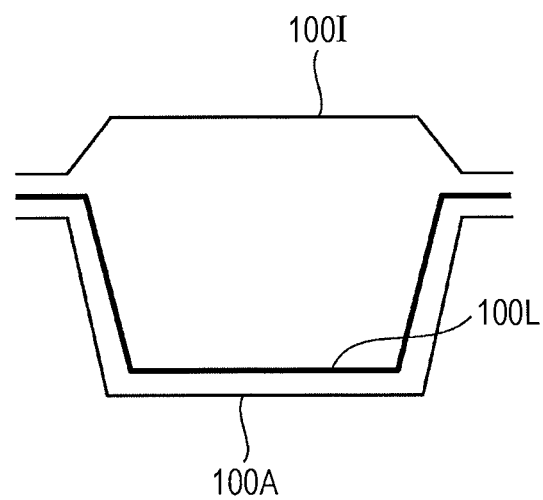
FIG. 3 is a partially enlarged cross-sectional view of the vehicle according to a first embodiment of the first aspect.

Next, a first embodiment to a tenth embodiment of the first aspect of the present invention will be described below by referring to FIG. 3 to FIG. 12. FIG. 3 is a partially enlarged cross-sectional view of the vehicle according to the first embodiment of the first aspect.

FIG. 3 shows a cross-sectional view of members of the vehicle such as the front pillar member 10, the roof pillar member 11, the center pillar member 12, and the side seal member 13. Each of the members includes: an outer panel 100A and an inner panel 100I that are made of a steel sheet (a high-tensile steel sheet or a super-high-tensile steel sheet), an iron sheet, an aluminum sheet, or the like and that are formed into a concave shape and a convex shape, respectively; and a reinforcement 101L that is made of CFRP and is formed into a concave shape along the outer panel 100A.

The outer panel 100A, the inner panel 100I, and the reinforcement 100L are mutually connected and secured through an adhesive, screws, rivets, or a resin.

Such a structure can linearly transmit a force to the members through the reinforcement 100L made of CFRP. The individual members have also high strength and reduced weight.

Figure 4:
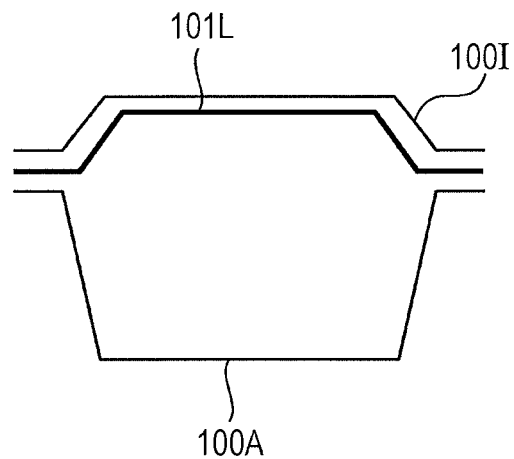
FIG. 4 is a partially enlarged cross-sectional view of the vehicle according to a second embodiment of the first aspect.

Next, a second embodiment of the first aspect will be described below by referring to FIG. 4. FIG. 4 is a partially enlarged cross-sectional view of the vehicle according to the second embodiment of the first aspect.

FIG. 4 shows a cross-sectional view of members of the vehicle 1 such as the front pillar member 10, the roof pillar member 11, the center pillar member 12, and the side seal member 13. Each of the members includes: an outer panel 100A and an inner panel 100I that are made of a steel sheet (a high-tensile steel sheet or a super-high-tensile steel sheet), an iron sheet, an aluminum sheet, or the like and that are formed into a concave shape and a convex shape, respectively; and a reinforcement 101L that is made of CFRP and is formed into a concave shape along the inner panel 100I.

The outer panel 100A, the inner panel 100I, and the reinforcement 101L are mutually connected and secured through an adhesive, screws, rivets, or a resin.

Such a structure can linearly transmit a force to the members through the reinforcement 100L made of CFRP. The individual members have also high strength and reduced weight.

Figure 5:
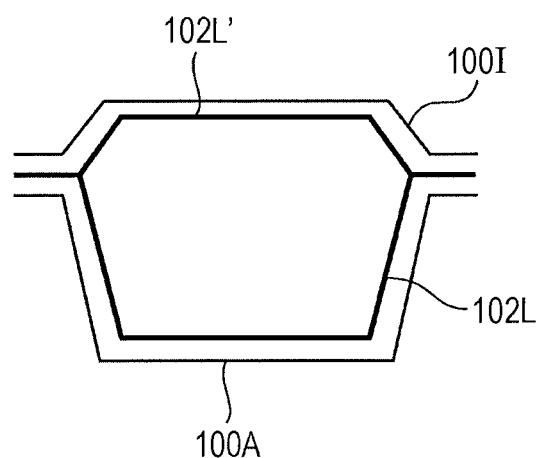
FIG. 5 is a partially enlarged cross-sectional view of the vehicle according to a third embodiment of the first aspect.

Next, a third embodiment of the first aspect will be described below by referring to FIG. 5. FIG. 5 is a partially enlarged cross-sectional view of the vehicle according to the third embodiment of the first aspect.

FIG. 5 shows a cross-sectional view of members of the vehicle 1 such as the front pillar member 10, the roof pillar member 11, the center pillar member 12, and the side seal member 13. Each of the members includes: an outer panel 100A and an inner panel 100I that are made of a steel sheet (a high-tensile steel sheet or a super-high-tensile steel sheet), an iron sheet, an aluminum sheet, or the like and that are formed into a concave shape and a convex shape, respectively; a reinforcement 102L that is made of CFRP and is formed into a concave shape along the outer panel 100A; and a reinforcement 102L' that is made of CFRP and is formed into a convex shape along the inner panel 100I.

The outer panel 100A, the inner panel 100I, the reinforcement 102L, and the reinforcement 102L' are mutually connected and secured through an adhesive, screws, rivets, or a resin.

Such a structure can linearly transmit a force to the members through the reinforcement 102L and the reinforcement 102L' made of CFRP.

Figure 6:
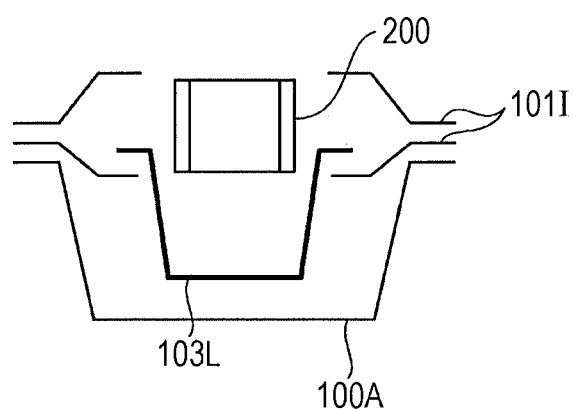
FIG. 6 is a partially enlarged cross-sectional view of the vehicle according to a fourth embodiment of the first aspect.

Next, a fourth embodiment of the first aspect will be described below by referring to FIG. 6. FIG. 6 is a partially enlarged cross-sectional view of the vehicle according to the fourth embodiment of the first aspect.

FIG. 6 shows a cross-sectional view of members of the vehicle 1 such as the center pillar member 12. Each of the members includes: an outer panel 100A that is made of a steel sheet (a high-tensile steel sheet or a super-high-tensile steel sheet), an iron sheet, an aluminum sheet, or the like and that is formed into a concave shape; inner panels 101I that are formed to hold a belt retractor 200 therebetween; and a reinforcement 103L that is formed into a concave shape extending from the ends of the inner panels 101I to the outer panel 100A.

The outer panel 100A and the inner panels 101I, 101I, and the inner panels 101I, 101I and the reinforcement 103L are connected and secured through an adhesive, screws, rivets, or a resin, respectively.

Such a structure can linearly transmit a force to the members through the reinforcement 103L made of CFRP. The individual members have also high strength and reduced weight.

Figure 7:
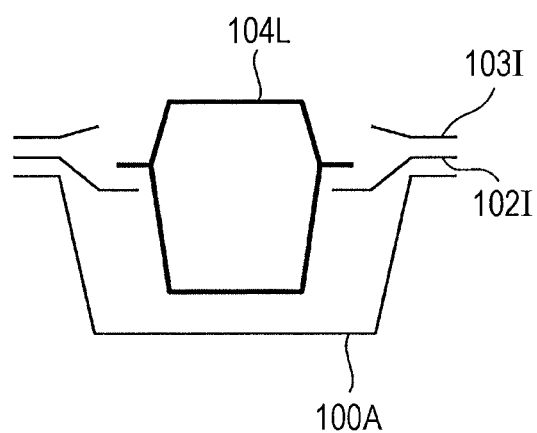
FIG. 7 is a partially enlarged cross-sectional view of the vehicle according to a fifth embodiment of the first aspect.

Next, a fifth embodiment of the first aspect will be described below by referring to FIG. 7. FIG. 7 is a partially enlarged cross-sectional view of the vehicle according to the fifth embodiment of the first aspect.

FIG. 7 shows a cross-sectional view of members of the vehicle such as the center pillar member 12. Each of the members includes: an outer panel 100A that is made of a steel sheet (a high-tensile steel sheet or a super-high-tensile steel sheet), an iron sheet, an aluminum sheet, or the like and that is formed into a concave shape; inner panels 102I and 103I; and a reinforcement 104L that has a substantially rectangular shape in cross section and extends from an end of the inner panel 102I.

The outer panel 100A and the inner panels 102I, 103I, and the inner panel 102I and reinforcement 104L are connected and secured through an adhesive, screws, rivets, or a resin, respectively.

Such a structure can linearly transmit a force to the members through the reinforcement 104L made of CFRP. The individual members have also high strength and reduced weight.

Figure 8:
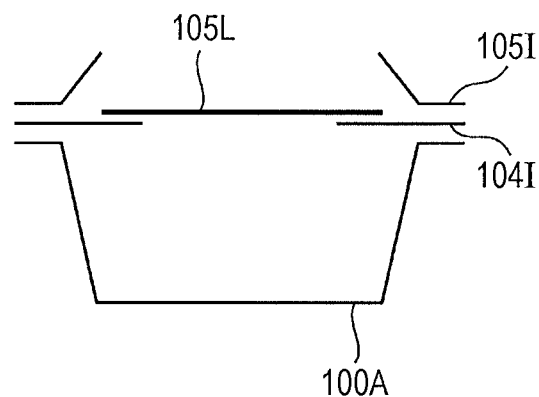
FIG. 8 is a partially enlarged cross-sectional view of the vehicle according to a sixth embodiment of the first aspect.

Next, a sixth embodiment of the first aspect will be described below by referring to FIG. 8. FIG. 8 is a partially enlarged cross-sectional view of the vehicle according to the sixth embodiment of the first aspect.

FIG. 8 shows a cross-sectional view of members of the vehicle such as the center pillar member 12. Each of the members includes: an outer panel 100A that is made of a steel sheet (a high-tensile steel sheet or a super-high-tensile steel sheet), an iron sheet, an aluminum sheet, or the like and that is formed into a concave shape; inner panels 104I and 105I; and a reinforcement 105L that is connected to an end of the inner panel 104I.

The outer panel 100A and the inner panels 104I, 105I, and the inner panel 104I and the reinforcement 105L are connected and secured through an adhesive, screws, rivets, or a resin, respectively.

Such a structure can linearly transmit a force to the members through the reinforcement 105L made of CFRP. The individual members have also high strength and reduced weight.

Figure 9:
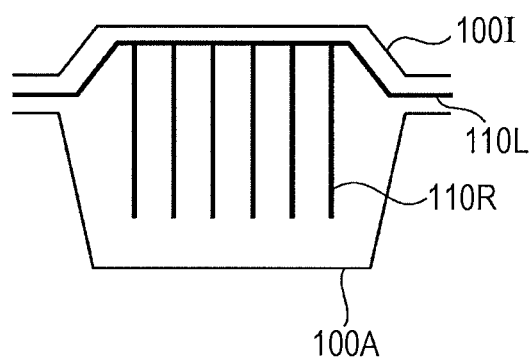
FIG. 9 is a partially enlarged cross-sectional view of the vehicle according to a seventh embodiment of the first aspect.

Next, a seventh embodiment of the first aspect will be described below by referring to FIG. 9. FIG. 9 is a partially enlarged cross-sectional view of the vehicle according to the seventh embodiment of the first aspect.

FIG. 9 shows a cross-sectional view of members of the vehicle 1 such as the front pillar member 10, the roof pillar member 11, the center pillar member 12, and the side seal member 13. Each of the members includes: an outer panel 100A that is made of a steel sheet (a high-tensile steel sheet or a super-high-tensile steel sheet), an iron sheet, an aluminum sheet, or the like and that is formed into a concave shape; and a reinforcement 110L that is formed into a convex shape and is provided with ribs 110R each being formed into a plate-like shape and each extending from an inner side to an outer side with the same thickness and length.

The outer panel 100A, inner panel 100I, and reinforcement 110L are mutually connected and secured through an adhesive, screws, rivets, or a resin.

Such a structure can linearly transmit a force to the members through the reinforcement 110L made of CFRP. The structure has very high strength, since the ribs 110R performs as a shock absorbing member.

The respective ribs 110R may have different lengths and may have the thicknesses that decrease gradually from the inner side to the outer side. Such a structure can adjust collision strength against a force in a direction at which the ribs 110R extend from the reinforcement 110L.

Figure 10:
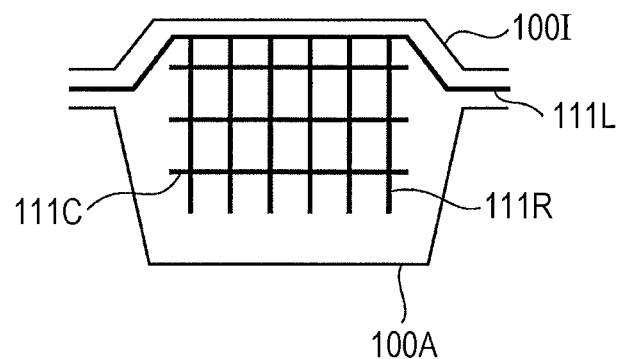
FIG. 10 is a partially enlarged cross-sectional view of the vehicle according to an eighth embodiment of the first aspect.

Next, an eighth embodiment of the first aspect will be described below by referring to FIG. 10. FIG. 10 is a partially enlarged cross-sectional view of the vehicle according to the eighth embodiment of the first aspect.

FIG. 10 shows a cross-sectional view of members of the vehicle 1 such as the front pillar member 10, the roof pillar member 11, the center pillar member 12, and the side seal member 13. Each of the members includes: an outer panel 100A that is made of a steel sheet (a high-tensile steel sheet or a super-high-tensile steel sheet), an iron sheet, an aluminum sheet, or the like and that is formed into a concave shape; an inner panel 100I that is formed into a convex shape; and a reinforcement 111L that is formed into a convex shape and is provided with a grid-like assembly having vertical ribs 111R and horizontal ribs 111C orthogonal to the vertical ribs 111R. Each of the vertical ribs 111R is formed into a plate-like shape and extends from an inner side to an outer side with the same thickness and length.

The outer panel 100A, inner panel 100I, and reinforcement 111L are mutually connected and secured through an adhesive, screws, rivets, or a resin.

Such a structure can linearly transmit a force to the members through the reinforcement 111L made of CFRP. The structure has very high strength, since the ribs 111R and 111C perform as a shock absorbing member.

The respective ribs 111R and 111C may have different lengths. The respective vertical ribs 111R may have the thicknesses that decrease gradually from the inner side to the outer side. Such a structure can adjust collision strength against a force in a direction at which the ribs 111R extend.

Figure 11:
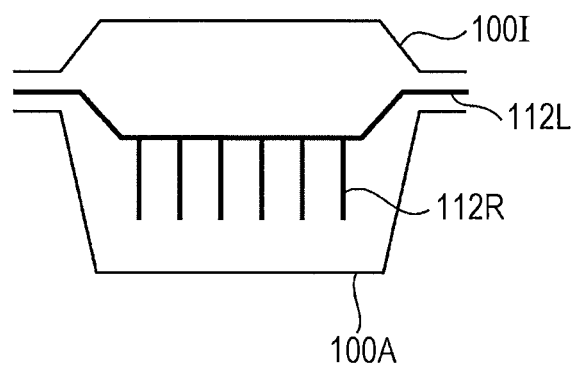
FIG. 11 is a partially enlarged cross-sectional view of the vehicle according to a ninth embodiment of the first aspect.

Next, a ninth embodiment of the first aspect will be described below by referring to FIG. 11. FIG. 11 is a partially enlarged cross-sectional view of the vehicle according to the ninth embodiment of the first aspect.

FIG. 11 shows a cross-sectional view of members of the vehicle 1 such as the front pillar member 10, the roof pillar member 11, the center pillar member 12, and the side seal member 13. Each of the members includes: an outer panel 100A that is made of a steel sheet (a high-tensile steel sheet or a super-high-tensile steel sheet), an iron sheet, an aluminum sheet, or the like and that is formed into a concave shape; an inner panel 100I that is formed into a convex shape; and a reinforcement 112L that is formed into a concave shape and is provided with ribs 112R each being formed into a plate-like shape and each extending from an inner side to an outer side with the same thickness and length.

The outer panel 100A, inner panel 100I, and reinforcement 112L are mutually connected and secured through an adhesive, screws, rivets, or a resin.

Such a structure can linearly transmit a force to the members through the reinforcement 112L made of CFRP. The structure has very high strength, since the ribs 112R performs as a shock absorbing member.

The respective ribs 112R may have different lengths and may have the thicknesses that decrease gradually from the inner side to the outer side. Such a structure can adjust collision strength against a force in a direction at which the ribs 112R extend.

Figure 12:
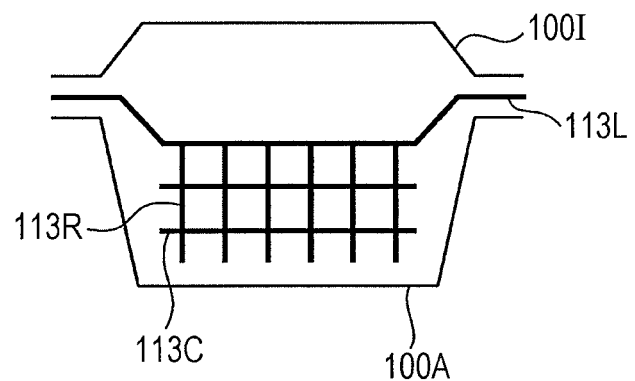
FIG. 12 is a partially enlarged cross-sectional view of the vehicle according to a tenth embodiment of the first aspect.

Next, a tenth embodiment of the first aspect will be described below by referring to FIG. 12. FIG. 12 is a partially enlarged cross-sectional view of the vehicle according to the tenth embodiment of the first aspect.

FIG. 12 shows a cross-sectional view of members of the vehicle 1 such as the front pillar member 10, the roof pillar member 11, the center pillar member 12, and the side seal member 13. Each of the members includes: an outer panel 100A that is made of a steel sheet (a high-tensile steel sheet or a super-high-tensile steel sheet), an iron sheet, an aluminum sheet, or the like and that is formed into a concave shape; an inner panel 100I that is formed into a convex shape; and a reinforcement 113L that is formed into a concave shape and is provided with a grid-like assembly having vertical ribs 113R and horizontal ribs 113C orthogonal to the vertical ribs 113R. Each of the vertical ribs 113R is formed into a plate-like shape and extends from an inner side to an outer side with the same thickness and length.

The outer panel 100A, inner panel 100I, and reinforcement 113L are mutually connected and secured through an adhesive, screws, rivets, or a resin.

Such a structure can linearly transmit a force to the members through the reinforcement 113L made of CFRP. The structure has very high strength, since the ribs 113R and 113C perform as a shock absorbing member.

The respective ribs 113R and 113C may have different lengths. Also, the respective ribs 113R may have the thicknesses that decrease gradually from the inner side to the outer side. Such a structure can adjust collision strength against a force in a direction at which the ribs 113R extend.

It should be noted that the first aspect is not limited to the above embodiments and that the first aspect can be applied to variously modified structures and constructions. For example, a reinforcement that has no flange and is made of CFRP may be utilized. The first aspect can be applied not only to the vehicle but also to wings of an airplane, a ship, and the like.

Structures and Effects of the Embodiments

The vehicle according to the embodiments includes a main frame having a structure in which the outer member and inner member are coupled to each other. Reinforcing members (reinforcement pillar center outers 23 and 24) made of reinforced plastics are interposed between the outer member and the inner member.

According to the above structure, it is possible to suitably design strength and stiffness, to balance both of collision safety and vehicle stability, and to obtain further strength.

In the vehicle according to the embodiments, a shock absorbing member made of reinforced plastics is provided with reinforcing members (ribs 110R, 111C, 111R, 112R, 113C, 113R).

According to the above structure, it is possible to increase collision strength.

The vehicle according to the embodiments is provided with shock absorbing members that extend from the reinforcing members (reinforcements 100L, 101L, 102L, 103L, 104L, 105L, 110L, 111L, 112L, 113L) to the outer member side.

According to the above structure, it is possible to suitably design strength and stiffness, to balance both of collision safety and vehicle stability, and to obtain further strength.

Furthermore, in the vehicle according to the embodiments, the shock absorbing members (ribs 110R, 111R, 112R, 113R) are formed into plate-like shapes and have the same thickness and length.

According to the above structure, it is possible to suitably design strength and stiffness, to balance both of collision safety and vehicle stability, and to obtain further strength.

In the vehicle according to the embodiments, the shock absorbing members are formed into plate-like shapes and have the same thickness and different lengths.

According to the above structure, it is possible to suitably design strength and stiffness, to balance both of collision safety and vehicle stability, and to obtain further strength.

Furthermore, in the vehicle according to the embodiments, the shock absorbing members are formed into plate-like shapes of which thicknesses are reduced gradually from the inner member side to the outer member side.

According to the above structure, it is possible to suitably design strength and stiffness, to balance both of collision safety and vehicle stability, and to obtain further strength.

Furthermore, in the vehicle according to the embodiments, the shock absorbing members are plate-like shapes and grid-like configurations (ribs 111C, 111R, 113C, 113R).

According to the above structure, it is possible to suitably design strength and stiffness, to balance both of collision safety and vehicle stability, and to obtain further strength.

In addition, in the vehicle according to the embodiments, reinforced plastics is fiber reinforced plastics or carbon fiber reinforced plastics.

According to the above structure, it is possible to suitably design strength and stiffness, to balance both of collision safety and vehicle stability, and to obtain further strength.

Next, the second aspect of the present invention will be described below.

Figure 13:
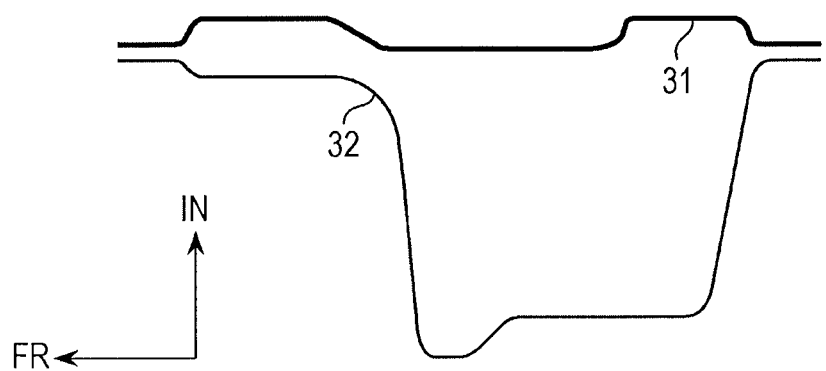
FIG. 13 is a cross-sectional view taken along lines XIII-XIII in FIG. 1, illustrating the vehicle according to a basic embodiment of the second aspect.
Figure 14:
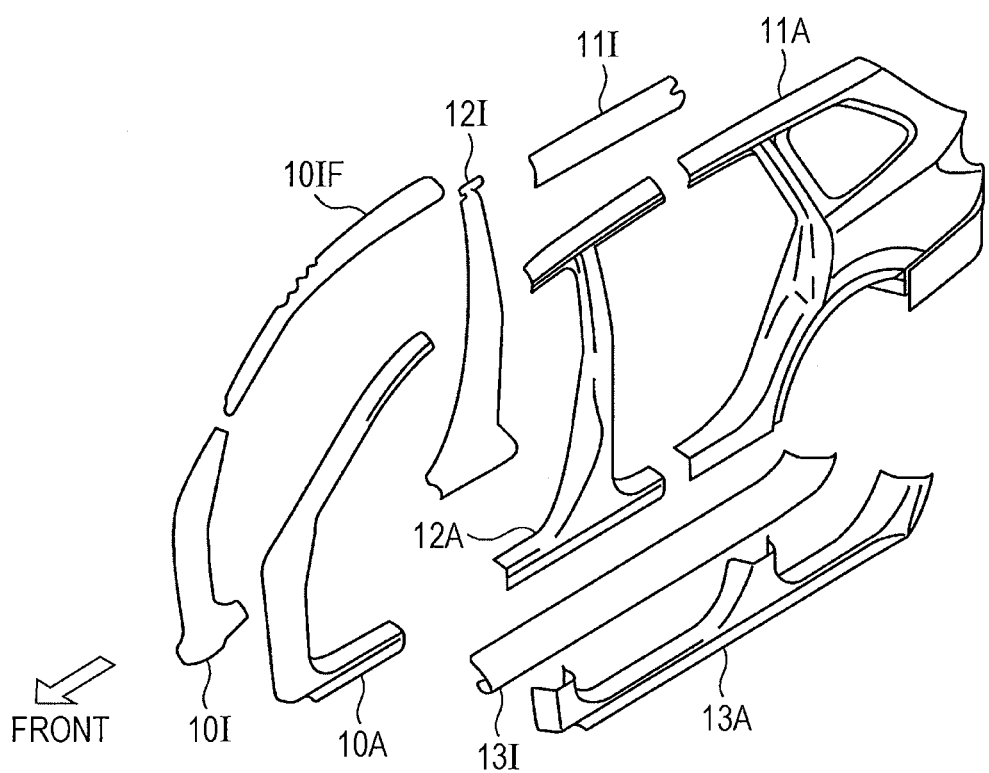
FIG. 14 is an explored perspective view of a part of the vehicle according to the basic embodiment of the second aspect.

FIG. 1, FIG. 13, and FIG. 14 show a basic embodiment of the second aspect. A basic embodiment of the second aspect will be described below by referring to FIG. 1, FIG. 13, and FIG. 14. Explanations concerning FIG. 1 are the same as the first aspect and the vehicle 1 includes a plurality of members and frames.

The respective members further include a plurality of members such as a combination of an inner member and an outer member, and a combination of the inner and outer members and a reinforcement interposed between the inner member and the outer member. In this embodiment, the inner member is made of carbon fiber reinforced plastics.

FIG. 13 is a cross-sectional view taken along lines XIII-XIII in FIG. 1, illustrating the vehicle 1 according to the basic embodiment of the second aspect. In the embodiment, a pillar center inner 31 and a panel side outer 32 are coupled to each other. The pillar center inner 31 is made of CFRP.

Ends of the pillar center inner 31 and ends of the panel side outer 32 are secured to each other through an adhesive, screws, rivets, or a resin.

FIG. 14 is a partially exploded perspective view of a vehicle according to the basic embodiment of the second aspect. The front pillar member 10 includes a front pillar outer element 10A, a front pillar inner element 10I, and a front pillar inner front element 101F. The front pillar inner element 10I and front pillar inner front element 101F are made of CFRP.

The roof pillar member 11 includes a part of a roof pillar outer panel element 11A, a part of a center pillar outer element 12A, and a roof pillar inner element 11I. The roof pillar inner element 11I is made of CFRP.

The center pillar member 12 includes a center pillar outer element 12A and a center pillar inner element 12I. The center pillar inner element 12I is made of CFRP.

The side seal member 13 includes a side seal outer element 13A and a side seal inner element 13I. The side seal inner element 13I is made of CFRP.

The second aspect described above can obtain the same effects as the first aspect.

Next, a first embodiment to an eighth embodiment of the second aspect will be described below by referring to FIG. 15 to FIG. 22.

Figure 15:
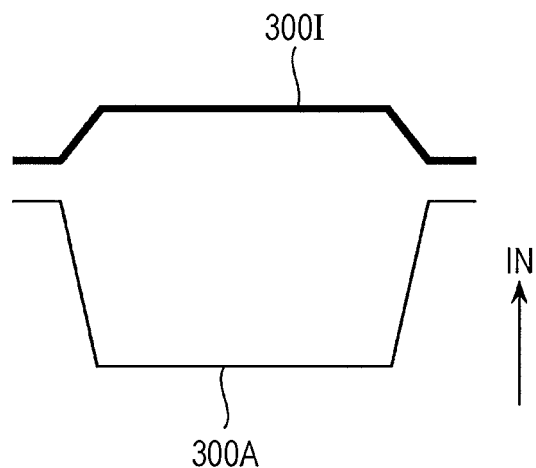
FIG. 15 is a partially enlarged cross-sectional view of the vehicle according to a first embodiment of the second aspect.

FIG. 15 is a partially enlarged cross-sectional view of the vehicle according to the first embodiment of the second aspect.

FIG. 15 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; and an inner panel 300I that is made of CFRP and is formed into a convex shape.

The outer panel 300A and inner panel 300I are connected and secured to each other through an adhesive, screws, rivets, or a resin.

Such a structure can linearly transmit a force to the members through the reinforcement 300I made of CFRP. The individual members have also high strength and reduced weight.

Figure 16:
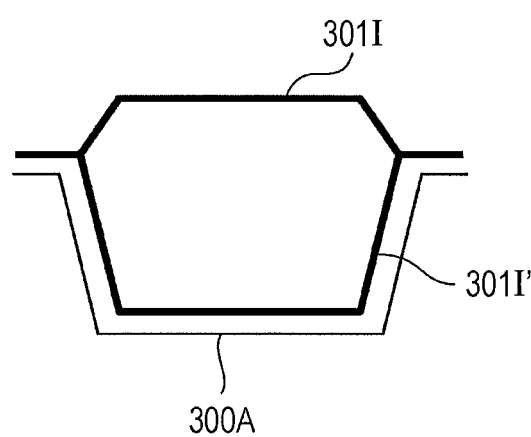
FIG. 16 is a partially enlarged cross-sectional view of the vehicle according to a second embodiment of the second aspect.

Next, a second embodiment of the second aspect will be described below by referring to FIG. 16. FIG. 16 is a partially enlarged cross-sectional view of the vehicle according to the second embodiment of the second aspect.

FIG. 16 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; an inner panel 301I that is made of CFRP and that is formed into a convex shape; and an inner panel 301I' that is formed into a concave shape along the outer panel 300A.

The outer panel 300A and inner panels 301I, 301I' are connected and secured to each other through an adhesive, screws, rivets, or a resin, respectively.

Such a structure can linearly transmit a force to the members through the inner panels 301I and 301I' made of CFRP. The individual members have also high strength and reduced weight.

Figure 17:
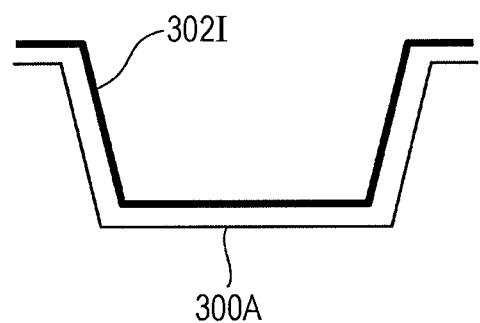
FIG. 17 is a partially enlarged cross-sectional view of the vehicle according to a third embodiment of the second aspect.

Next, a third embodiment of the second aspect will be described below by referring to FIG. 17. FIG. 17 is a partially enlarged cross-sectional view of the vehicle according to the third embodiment of the second aspect.

FIG. 17 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; and an inner panel 302I that is formed into the concave shape along the outer panel 300A.

The outer panel 300A and inner panels 302I are connected and secured to each other through an adhesive, screws, rivets, or a resin.

Such a structure can linearly transmit a force to the members through the inner panel 302I made of CFRP. The structure can reduce the weight since the reinforcement or the like is not required.

Figure 18:
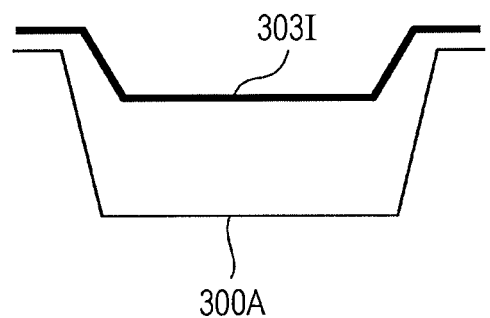
FIG. 18 is a partially enlarged cross-sectional view of the vehicle according to a fourth embodiment of the second aspect.

Next, a fourth embodiment of the second aspect will be described below by referring to FIG. 18. FIG. 18 is a partially enlarged cross-sectional view of the vehicle according to the fourth embodiment of the second aspect.

FIG. 18 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that are formed into a concave shape; and an inner panel 303I that is formed into a concave shape so that ends of the inner panel 303I are located slightly outward from the end of the outer panel 300A.

The outer panel 300A and inner panels 303I are connected and secured to each other through an adhesive, screws, rivets, or a resin.

Such a structure can linearly transmit a force to the members through the inner panel 303I made of CFRP. The individual members have also high strength and reduced weight.

Figure 19:
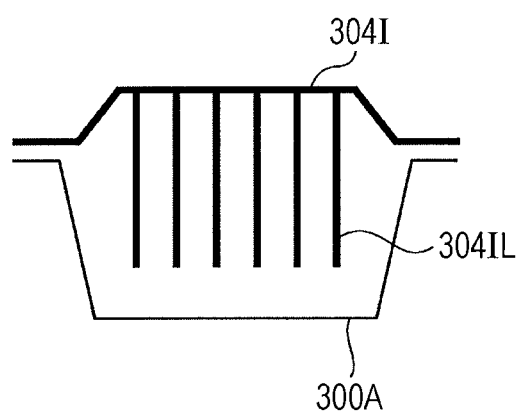
FIG. 19 is a partially enlarged cross-sectional view of the vehicle according to a fifth embodiment of the second aspect.

Next, a fifth embodiment of the second aspect will be described below by referring to FIG. 19. FIG. 19 is a partially enlarged cross-sectional view of the vehicle according to the fifth embodiment of the second aspect.

FIG. 19 shows a cross-sectional view of members of the vehicle 1 such as the front pillar member 10, the roof pillar member 11, the center pillar member 12, and the side seal member 13. Each of the members includes; an outer panel 300A that is made of a steel sheet (a high-tensile steel sheet or a super-high-tensile steel sheet), an iron sheet, an aluminum sheet, or the like and that is formed into a concave shape; and an inner panel 304I that is formed into a convex shape. The inner panel 304I is provided with ribs 304IL each being formed into a plate-like shape and each extending from an inner side to an outer side with the same thickness and length.

The outer panel 300A and inner panel 304I are connected and secured to each other through an adhesive, screws, rivets, or a resin.

Such a structure can linearly transmit a force to the members through the inner panel 304I made of CFRP. The structure has very high strength, since the ribs 304IL performs as a shock absorbing member.

The respective ribs 304IL may have different lengths and may have the thicknesses that decrease gradually from the inner side to the outer side. Such a structure can adjust collision strength against a force in a direction at which the ribs 304IL extend from the inner panel 304I.

Figure 20:
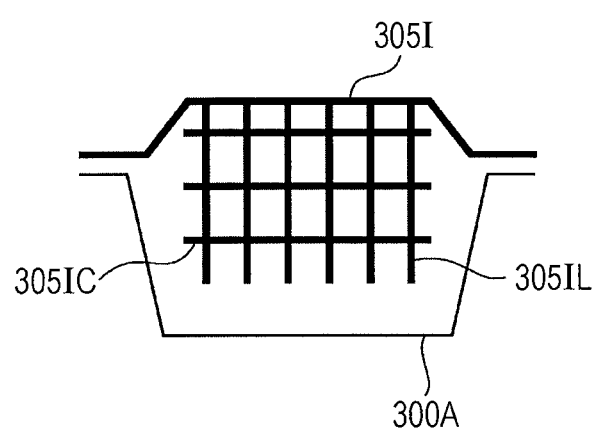
FIG. 20 is a partially enlarged cross-sectional view of the vehicle according to a sixth embodiment of the second aspect.

Next, a sixth embodiment of the second aspect will be described below by referring to FIG. 20. FIG. 20 is a partially enlarged cross-sectional view of the vehicle according to the sixth embodiment of the second aspect.

FIG. 20 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; an inner panel 305I that is formed into a convex shape. The inner panel 305I is provided with a grid-like assembly having vertical ribs 305IL and horizontal ribs 305IC orthogonal to the vertical ribs 305IL. Each of the vertical ribs 305IL is formed into a plate-like shape and extends from an inner side to an outer side with the same thickness and length.

The outer panel 300A and inner panel 305I are connected and secured to each other through an adhesive, screws, rivets, or a resin.

Such a structure can linearly transmit a force to the members through the inner panel 305I made of CFRP. The structure has very high strength, since the ribs 305IL and 305IC perform as a shock absorbing member.

The respective ribs 305IL and 305IC may have different lengths. The respective ribs 305IL may have the thicknesses that decrease gradually from the inner side to the outer side. Such a structure can adjust collision strength against a force in a direction at which the ribs 305IL extend.

Figure 21:
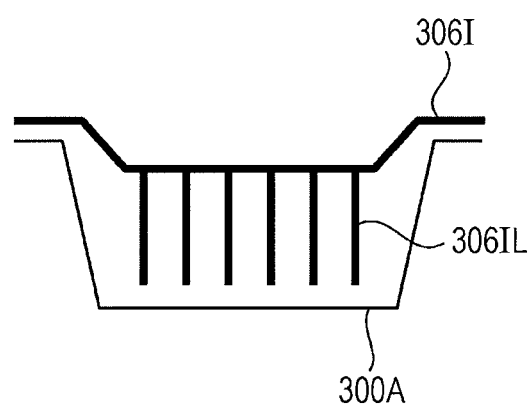
FIG. 21 is a partially enlarged cross-sectional view of the vehicle according to a seventh embodiment of the second aspect.

Next, a seventh embodiment of the second aspect will be described below by referring to FIG. 21. FIG. 21 is a partially enlarged cross-sectional view of the vehicle according to the seventh embodiment of the second aspect.

FIG. 21 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; an inner panel 306I that is formed into a concave shape. The inner panel 306I is provided with ribs 306IL each being formed into a plate-like shape and each extending from an inner side to an outer side with the same thickness and length.

The outer panel 300A and inner panel 306I are connected and secured to each other through an adhesive, screws, rivets, or a resin.

Such a structure can linearly transmit a force to the members through the inner panel 306I made of CFRP. The structure has very high strength, since the ribs 306IL performs as a shock absorbing member.

The respective ribs 306IL may have different lengths and may have the thicknesses that decrease gradually from the inner side to the outer side. Such a structure can adjust collision strength against a force in a direction at which the ribs 306IL extend.

Figure 22:
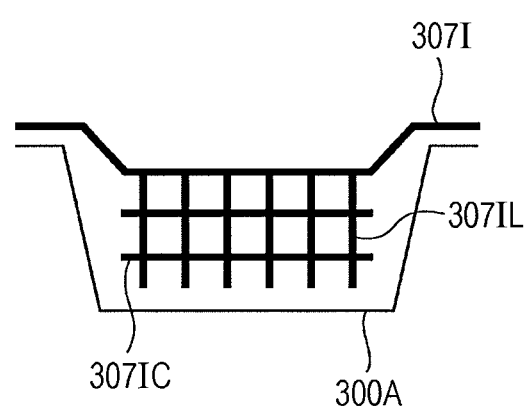
FIG. 22 is a partially enlarged cross-sectional view of the vehicle according to an eighth embodiment of the second aspect.

Next, an eighth embodiment of the second aspect will be described below by referring to FIG. 22. FIG. 22 is a partially enlarged cross-sectional view of the vehicle according to the eighth embodiment of the second aspect.

FIG. 22 shows a cross-sectional view of members of the vehicle 1 such as the front pillar member 10, the roof pillar member 11, the center pillar member 12, and the side seal member 13. Each of the members includes: an outer panel 300A that is made of a steel sheet (a high-tensile steel sheet or a super-high-tensile steel sheet), an iron sheet, an aluminum sheet, or the like and that is formed into a concave shape; an inner panel 307I that is formed into a concave shape. The inner panel 307I is provided with a grid-like assembly having vertical ribs 307IL and horizontal ribs 307IC orthogonal to the vertical ribs 307IL. Each of the vertical ribs 307IL is formed into a plate-like shape and extends from an inner side to an outer side with the same thickness and length.

The outer panel 300A and inner panel 307I are connected and secured to each other through an adhesive, screws, rivets, or a resin.

Such a structure can linearly transmit a force to the members through the inner panel 307I made of CFRP. The structure has very high strength, since the ribs 307IL and 307IC perform as a shock absorbing member.

The respective ribs 307IL and 307IC may have different lengths. The respective ribs 307IL may have the thicknesses that decrease gradually from the inner side to the outer side. Such a structure can adjust collision strength against a force in a direction at which the ribs 307IL extend.

It should be noted that the second aspect is not limited to the above embodiments and that the second aspect can be applied to variously modified structures and constructions. The second aspect can be applied not only to the vehicle but also to wings of an airplane, a ship, and the like.

Structures and Effects of the Embodiments

The vehicle according to the embodiments includes a plurality of members. One (for example, the pillar center inner 31) of at least two interconnected members (for example, the pillar center inner 31 and panel side outer 32) is made of reinforced plastics.

According to the above structure, it is possible to suitably design strength and stiffness and to balance both of collision safety and vehicle stability.

In the vehicle according to the embodiments, the connecting members (the center pillar inner element 12I, the side seal inner element 13I) that connect at least two members to each other are made of reinforced plastics.

According to the above structure, it is possible to suitably design strength and stiffness and to balance both of collision safety and vehicle stability.

The vehicle according to the embodiments includes a vehicle structure having an inner member (the pillar center inner 31) and an outer member (the panel side outer 32). The inner member (the pillar center inner 31) is made of reinforced plastics.

In the vehicle according to the embodiments, a reinforced plastics panel is provided on an outer member (the outer panel 300A) at the inside of the vehicle.

According to the above structure, the vehicle can reduce the weight, since the reinforcement for increasing strength is not required.

Furthermore, the vehicle according to the embodiments includes the shock absorbing members (the ribs 304IL, 305IC, 305IL, 306IL, 307IC, 307IL) provided on the member and/or the connecting member made of reinforced plastics.

According to the above structure, it is possible to suitably design strength and stiffness and to balance both of collision safety and vehicle stability.

The vehicle according to the embodiments is provided with shock absorbing members (the ribs 304IL, 305IL, 306IL, 307IL) that extend from an inner member side to an outer member side.

According to the above structure, it is possible to suitably design strength and stiffness and to balance both of collision safety and vehicle stability.

Furthermore, in the vehicle according to the embodiments, the shock absorbing members (the ribs 304IL, 305IL, 306IL, 307IL) are formed into plate-like shapes and have the same thickness and length.

According to the above structure, it is possible to suitably design strength and stiffness and to balance both of collision safety and vehicle stability.

Furthermore, in the vehicle according to the embodiments, the shock absorbing members are formed into plate-like shapes and have the same thickness and different length.

According to the above structure, it is possible to suitably design strength and stiffness and to balance both of collision safety and vehicle stability.

Furthermore, in the vehicle according to the embodiments, the shock absorbing members are formed into plate-like shapes and have thicknesses that decrease gradually from an inner member side to the outer member side.

According to the above structure, it is possible to suitably design strength and stiffness and to balance both of collision safety and vehicle stability.

Furthermore, in the vehicle according to the embodiments, the shock absorbing members are plate-like shapes and grid-like configurations (the ribs 305IC, 305IL, 307IC, 307IL).

According to the above structure, it is possible to suitably design strength and stiffness and to balance both of collision safety and vehicle stability.

In addition, in the vehicle according to the embodiments, reinforced plastics is fiber reinforced plastics or carbon fiber reinforced plastics.

According to the above structure, it is possible to suitably design strength and stiffness and to balance both of collision safety and vehicle stability.

Definition

Reinforced plastics in the second aspect includes fiber reinforced plastics (FRP), carbon fiber reinforced plastics (CFRP), carbon fiber reinforced thermosets (CFRTS), carbon fiber reinforced thermoplastics (CFRTP), and the like.

What is claimed is:

1. A vehicle frame constituted by a structure in which an outer member and an inner member are connected to each other, wherein
    a reinforcing member made of reinforced plastic is interposed between the outer member and the inner member, and includes shock absorbing members made of reinforced plastic,
    the shock absorbing members comprise ribs that extend from a reinforcing member side to an outer member side, and
    the ribs are plate shaped with a thickness that decreases gradually from an inner member side to an outer member side.

2. The vehicle frame according to claim 1, wherein the shock absorbing members are formed into plate shapes and have the same thickness and different lengths.

3. A vehicle frame comprising a plurality of frame-elements, wherein at least one frame-element comprises an innermost member and an outermost member connected to one another, and at least one of the innermost member and the outermost member is made of reinforced plastic.

4. The vehicle frame according to claim 3, wherein a connecting member that connects the innermost and outermost members is made of reinforced plastic.

5. The vehicle frame according to claim 3, wherein the innermost member is made of reinforced plastic.

6. The vehicle frame according to claim 5, wherein the outermost member is provided with a reinforced plastic panel on an inner side.

7. The vehicle frame according to claim 3, wherein at least one of the innermost member and the outermost member includes shock absorbing members, and the shock absorbing members extend from an inner side to an outer side of the vehicle frame.

8. The vehicle frame according to claim 4, wherein at least one of the innermost member, the outermost member, and the connecting member includes shock absorbing members, and the shock absorbing members extend from an inner side to an outer side of the vehicle frame.

9. The vehicle frame according to claim 5, wherein at least one of the innermost member, the outermost member, and the connecting member includes shock absorbing members, and the shock absorbing members extend from an inner side to an outer side of the vehicle frame.

10. The vehicle frame according to claim 6, wherein at least one of the innermost member, the outermost member, and the connecting member includes shock absorbing members, and the shock absorbing members extend from an inner side to an outer side of the vehicle frame.

11. A vehicle comprising the vehicle frame of claim 3.

12. A vehicle comprising the vehicle frame of claim 1.

13. A vehicle frame comprising a structure in which an outer member and an inner member are connected to each other, wherein a reinforcing member made of reinforced plastic is interposed between the outer member and the inner member, and wherein the reinforcing member is a sheet member.

14. The vehicle frame according to claim 13, wherein the reinforcing member is a sheet member comprising a concave section.

15. The vehicle frame according to claim 14, wherein the concave section of the reinforcing member extends toward the inner member.

16. The vehicle frame according to claim 14, wherein the concave section of the reinforcing member extends toward the outer member.

17. The vehicle frame according to claim 13, wherein wherein two reinforcing members made of reinforced plastic are interposed between the outer member and the inner member.

18. A vehicle comprising the vehicle frame of claim 13.

* * * * *